Nov. 1, 1955 — M. Z. MULLEN — 2,722,086
METHOD OF FORMING APERTURES IN GLASSWARE AND THE LIKE
Filed Aug. 8, 1952

INVENTOR.
Melvin Z. Mullen
BY Charles Shepard
Attorney

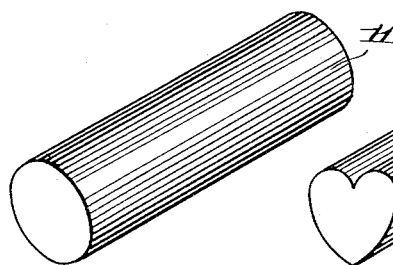
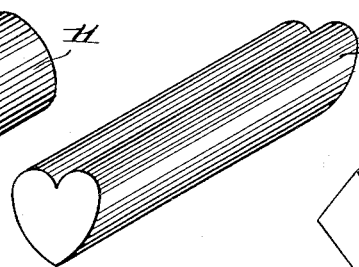
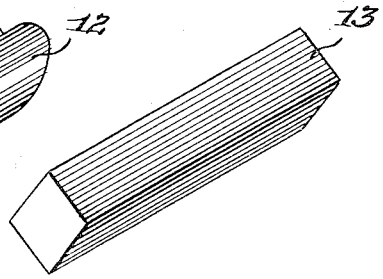
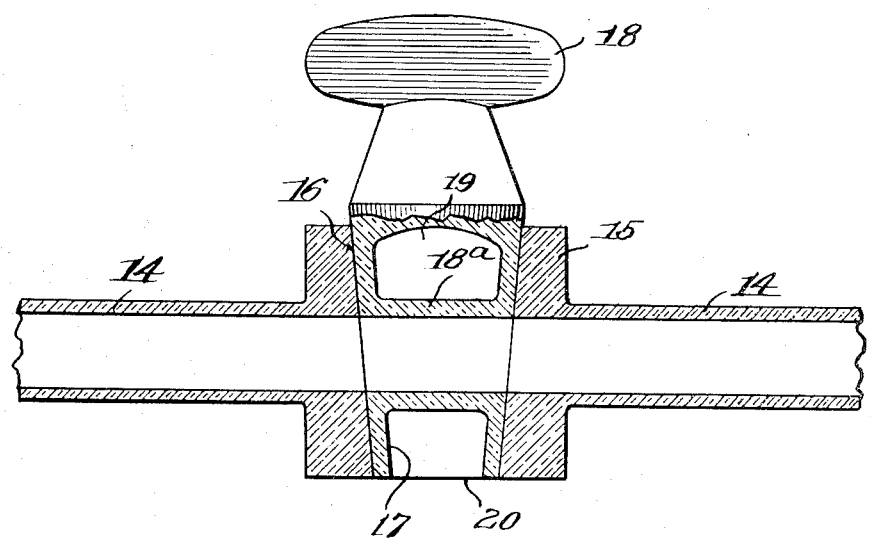

United States Patent Office 2,722,086
Patented Nov. 1, 1955

2,722,086

METHOD OF FORMING APERTURES IN GLASSWARE AND THE LIKE

Melvin Z. Mullen, Rochester, N. Y.

Application August 8, 1952, Serial No. 303,220

7 Claims. (Cl. 49—84)

The present invention relates to the treatment of hollow fusible articles composed of glass or similar material that is normally firm but welds when fluxed, and is pliable and moldable at intermediate heats, and the invention has for its general object to provide a desirable article of this nature in hollow ware that will have its opposite walls connected by an intermediate, substantially tubular wall with the end result that a sealed hole is produced extending entirely through the article from side to side.

A further object is to provide a simple, rapid and effective method of forming and molding the tubular connecting wall.

More specific objects are to provide such holes in glass bottles and flasks, and to mold them (the holes) into different utilitarian or artistic designs whereby the article may be suspended from a cord or chain or hung from a peg, and also provide a hole of this kind to transmit chemicals and other fluids through hollow stoppers in a glass fluid supply line in the manner of a stop cock, all as will be further elaborated upon.

These and other desirable objects are accomplished by the construction disclosed as an illustrative embodiment of the invention in the following description and in the accompanying drawings forming a part hereof, in which:

Fig. 7 is a perspective view of one type of mandrel adapted to give one shape to the hole;

Fig. 8 is a similar view of another type of mandrel adapted to give it another shape;

Figure 1:
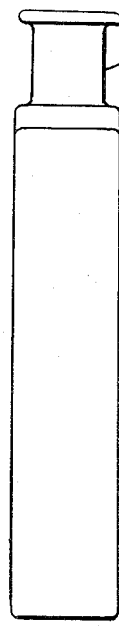
Fig. 1 is a side elevation of a small flat flask such as is used to contain a small amount of liquid, as for instance perfume tinctures, the same being in its original form before the hole is made.

Fig. 9 is a view of a third type of mandrel for fashioning the hole in still another shape, and Fig. 10 is a vertical, central section through a glass or similar fluid supply line and through a valve therein in the nature of a stop cock provided with a rotary stopper for opening and closing the line, the stopper having been treated in the same manner as the bottle of Figs. 1 to 7 in molding the hole therein.

The same reference numerals throughout the several views indicate the same parts.

Referring more particularly to the drawings, and first to Figs. 1 through 7 thereof, 1 indicates, as an example, a somewhat generally rectangular and generally flat glass bottle or flask with the usual open stopper neck 2. To form a transverse hole therethrough from side to side and front to rear in accordance with the present method, the flask is placed between two alined flame throwing nozzles A and B so that the flames therefrom impinge against the opposite front and rear walls 3 and 4 over correspondingly restricted areas thereof. The burners or torches are shown only in a conventional way, any form of unit that will spot heat the restricted areas being suitable for use.

Figure 2:
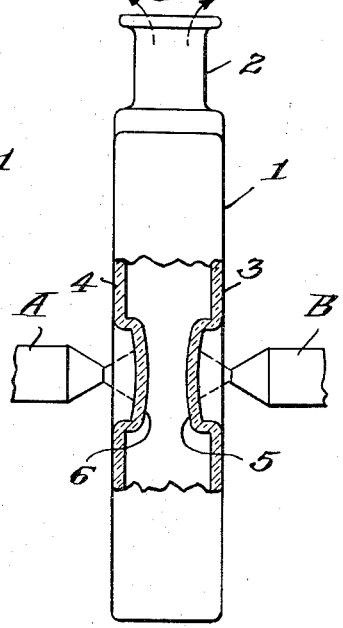
Fig. 2 is a similar view, but partially in vertically central section showing a first step in the method of treating the bottle to form a transverse hole therein of the above outlined nature.

The first effect of the heat treatment appears in Fig. 2 where the glass of the restricted areas on both walls have started to flux under the application of heat, and at this point or previously, and assuming that the treatment is progressing under atmospheric surrounding pressure, suitable exhaust means (not shown) is employed to exhaust pressure from the interior of the flask through the open neck 2. This causes the two fluxed restricted area wall portions 5 and 6 to bow inwardly toward each other under the surrounding atmospheric pressure and the lack of counter pressure resistance inside.

Figure 3:
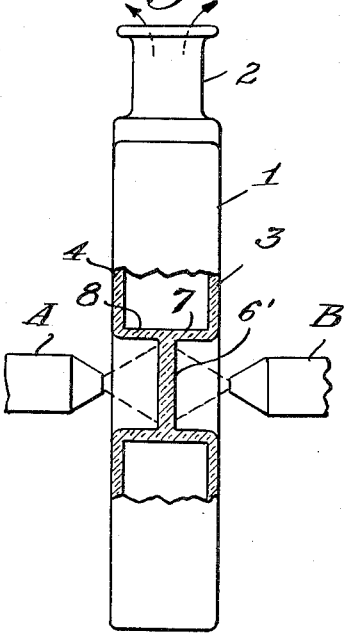
Fig. 3 is a view similar to Fig. 2 showing the next succeeding step in the formation of the hole.
Figure 4:
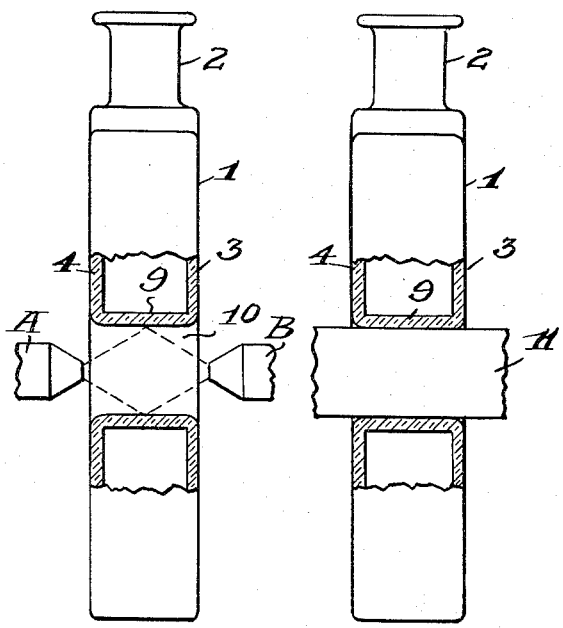
Fig. 4 is a similar view showing a further resulting development in which the hole is completed in a preliminary fashion.
Figure 5:
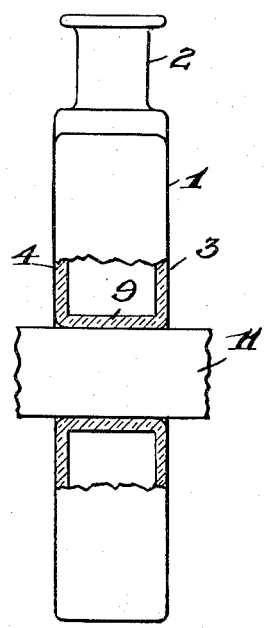
Fig. 5 is a similar section showing the final step in the formation of the hole in which its walls are molded to a desired configuration.

As the heating further progresses, the two portions of fused glass weld themselves together in a film at the center as indicated at 6' in Fig. 3. In the meantime the less highly heated margins of these areas retain their form somewhat but are quite soft and flexible, and are bent inwardly by the outside pressure substantially at right angles so that they meet and join edgewise, as indicated at 7 and 8 in Fig. 3.

The fused wall 6', for the sake of clarity, is perhaps shown somewhat exaggerated in thickness in Fig. 3, but at any rate if the spot heat continues directly against it, its next performance is to disappear by fusing in to the transverse wall portions 7 and 8, still under atmospheric pressure, and to finally subside and form with the portions 7 and 8 a continuous wall 9 that forms an interiorly and exteriorly sealed hole 10 extending through the flask.

Figure 6:
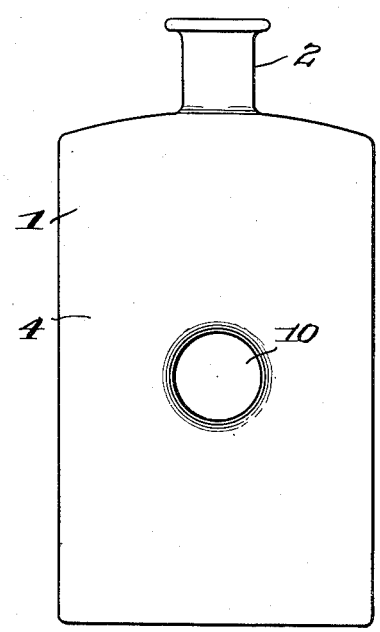
Fig. 6 is a front elevation of the completed article.

At this point the flask is withdrawn from between the burners or at any rate their operation is discontinued, and as a final step a mandrel 11 of suitable size, shape and material is thrust through the hole 10 while the walls 9 thereof are still soft so that the hole is molded in the final shape of the mandrel, which latter is, of course, withdrawn as the glass cools to set itself, and the perforated but sealed flask is complete, as shown in the face view of Fig. 6. At this point, and before the glass contacting the mandrel has lost its softness, the pressures within and without the flask are preferably reversed, as for instance by introducing positive pressure such as compressed air into the bottle neck overcoming the surrounding atmospheric pressure. This causes the tubular wall 9 to closely hug the mandrel and to definitely shape itself to the surface contour thereof under reverse pressure from the inside.

The particular mandrel indicated at 11 appears in perspective in Fig. 7, being simply a cylindrical bar to make a round opening 10. However, it is obvious that other cross sectional shapes may be used for special utilitarian or artistic purposes, such as the heart shaped bar 12 of Fig. 8 and the diamond shaped bar 13 of Fig. 9.

At any rate, the sealed hole 10 is useful otherwise than as a matter of appearance, in suspending the bottle on a cord or chain for instance, or for hanging it on a nail or peg. In the figures the hole is shown substantially in the center of the flask, but for retaining it in an upright or inverted desired position on a peg, its position could of course be changed to one nearer the neck or nearer the bottom.

Referring now to Fig. 10, in the chemical field glass fluid conducting pipes and systems are frequently used for the supply of the more active chemicals, such as acids and alkalis, and the present method may be here utilized in the formation of the hollow stoppers or valve elements utilized to control the flow in these lines. A fragment of such a line is shown in this figure as comprising the piping 14 running through a stop cock casing 15 containing a tapered valve opening 16. The latter is occupied by a hollow glass stopper 17 turned by a projecting thumb piece 18, and here again there is present a tubular transverse wall 18$^a$ spanning the cavity 19 in the hollow stopper and extending between the opposite walls thereof to be turned into and out of register with the bore of the pipe line 14. Such tubular wall is formed in accordance with the same method explained with reference to Figs. 1 to 7 inclusive, the mandrel 11 of plain cylindrical form being of course used in this case. The evacuation of the interior of the hollow stopper to provide the diversity of interior and exterior pressure can, of course, be effected by applying the evacuating means to the open end 20 of the hollow stopper body just as it was applied to the bottle neck opening in the first described embodiment of the invention.

One use of the invention contemplated by applicant that combines the utilitarian with the ornamental aspects thereof is to produce miniature perfume bottles such as shown in Figs. 1 to 7 with the heart shaped hole of Fig. 8 for instance, so that it may be suspended about a woman's neck on a decorative chain or as a pendant on a necklace and concealed in the bosom when not in use.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A method of forming generally tubular connecting walls between and sealed to opposite side walls of hollow articles composed of glass and similarly fusible material, which embodies spot heating each of said side walls over restricted alined areas thereof to a point of flux while exhausting the pressure within the hollow article below that of pressure surrounding it, allowing the fused glass from both side walls to unite under the external pressure and form a continuous transverse generally tubular connecting wall between said side walls before cooling, and inserting a mandrel of selected cross sectional configuration through the generally tubular connecting wall after the said opposite walls have met to form the tubular wall but before cooling and while the tubular wall is still in a condition of fused pliability to give the finished aperture and the walls thereof and tube a desired shape.

2. A method in accordance with claim 1 including also the step of reversing the inside and outside pressures after the mandrel has been inserted so that the greater pressure will be on the inside of the hollow article to press the tubular wall against the mandrel.

3. The method of forming a transverse connecting tube between two opposite side walls of a hollow glass article, the connecting tube being open throughout its length and being sealed at both ends to surrounding portions of said opposite side walls, which comprises the steps of applying localized heat to the side walls in the areas where the tube is to connect with them, heating said areas to a sufficient extent to render said areas substantially flowable under moderate pressure while maintaining the remainder of said side walls sufficiently cool to prevent flow under said pressure, pressing the heated areas of the side walls laterally inwardly toward each other to form two tubular portions with closed inner ends which move progressively inwardly toward each other while pressure is continued, the tubular portions and inner ends being formed by flow of glass from said heated areas, continuing the pressing until said inner ends of the two tubular portions meet and join each other, and heating the joined inner ends sufficiently to burn through the inner ends and to cause the glass from said inner ends to flow to and merge with the walls of the connecting tube, thus forming a connecting tube which is open throughout its length.

4. The method as defined in claim 3, in which said inward pressing of the heated areas of the side walls is accomplished by maintaining a gas pressure within said hollow article which is less than the gas pressure surrounding said hollow article.

5. The method as defined in claim 3, in which said inward pressing of the heated areas of the side walls is accomplished by creating a partial vacuum within said hollow article while maintaining substantially atmospheric pressure surrounding said hollow article.

6. The method as defined in claim 3, including the further steps of inserting mandrel means within said connecting tube while maintaining the walls of the connecting tube sufficiently hot to flow under pressure, and pressing the walls of the connecting tube inwardly against the mandrel means until the inner surface of the connecting tube comes into contact with and becomes shaped and sized by the outer surface of the mandrel means.

7. The method as defined in claim 6, in which the pressing of the walls of the connecting tube against the mandrel means is accomplished by creating a gas pressure within said hollow article which is greater than the atmospheric pressure surrounding said hollow article.

References Cited in the file of this patent

UNITED STATES PATENTS

| | | |
|---|---|---|
| D. 34,895 | McFaddin | Aug. 6, 1901 |
| D. 47,650 | Roach | July 27, 1915 |
| 1,301,714 | Kueppers | Apr. 22, 1919 |
| 1,967,603 | Zimber | July 24, 1934 |
| 2,491,848 | Breadner et al. | Dec. 20, 1949 |

FOREIGN PATENTS

| | | |
|---|---|---|
| 15,114 | Great Britain | Aug. 29, 1907 |
| 718,140 | France | Jan. 19, 1932 |